(12) United States Patent
Bermel et al.

(10) Patent No.: US 7,304,317 B2
(45) Date of Patent: Dec. 4, 2007

(54) PHOSPHOR PANEL WITH STABILIZER

(75) Inventors: Marcus S. Bermel, Pittsford, NY (US); David J. Steklenski, Rochester, NY (US); James H. Griggs, Montross, VA (US); Katherine M. Broadus, Aurora, IL (US); Alexandra D. Bermel, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 64 days.

(21) Appl. No.: 11/375,623

(22) Filed: Mar. 14, 2006

(65) Prior Publication Data

US 2007/0215818 A1    Sep. 20, 2007

(51) Int. Cl.
*G03B 42/08* (2006.01)

(52) U.S. Cl. .................................. 250/484.4

(58) Field of Classification Search ............. 250/484.2, 250/484.3, 484.4, 484.5
See application file for complete search history.

(56) References Cited

U.S. PATENT DOCUMENTS

| | | |
|---|---|---|
| 4,138,529 A | 2/1979 | Mori et al. |
| 4,505,989 A | 3/1985 | Umemoto et al. |
| 4,900,641 A | 2/1990 | Kohda et al. |
| 4,926,047 A | 5/1990 | Takahashi et al. |
| 5,077,144 A | 12/1991 | Takahashi et al. |
| 5,401,971 A | 3/1995 | Roberts |
| 5,427,868 A | 6/1995 | Bringley et al. |
| 5,464,568 A | 11/1995 | Bringley et al. |
| 5,507,976 A | 4/1996 | Bringley et al. |
| 5,523,558 A | 6/1996 | Bringley et al. |
| 5,569,530 A | 10/1996 | Dooms et al. |
| 5,630,963 A | 5/1997 | Leblans et al. |
| 5,639,400 A | 6/1997 | Roberts et al. |
| 5,641,967 A * | 6/1997 | Bringley et al. ......... 250/484.4 |
| 5,789,021 A | 8/1998 | Dooms et al. |
| 6,031,237 A * | 2/2000 | Fukui et al. ............. 250/484.4 |
| 6,589,635 B2 | 7/2003 | Suzuki et al. |
| 7,227,158 B1 * | 6/2007 | Patel et al. ............. 250/484.5 |

FOREIGN PATENT DOCUMENTS

| | | |
|---|---|---|
| EP | 0 107 192 | 5/1984 |
| EP | 0 541 146 | 7/1995 |
| EP | 0 648 254 | 10/1996 |
| EP | 1 286 365 | 2/2003 |
| JP | 1999-352300 | 12/1999 |

* cited by examiner

*Primary Examiner*—Constantine Hannaher

(57) ABSTRACT

Phosphor-containing panels or screens have improved resistance to yellowing and image defects by the incorporation of a primary or secondary amine having a pKa of 8.5 or more and a molecular weight of less than 10,000 daltons into the phosphor layer or an overcoat layer. A peroxide scavenger can also be present to further improve stability of the phosphor panel. The phosphors are preferably storage phosphors containing iodine. This phosphor panels can be prepared using non-peroxide-generating organic solvents for further stabilization.

29 Claims, No Drawings

PHOSPHOR PANEL WITH STABILIZER

FIELD OF THE INVENTION

This invention relates to new and improved phosphor panels (or radiographic screens). In particular, it relates to storage panels having improved stability from yellowing generated by the presence of phosphors, especially iodide-containing phosphors. This invention also relates to a method of making these phosphor panels.

BACKGROUND OF THE INVENTION

Near the beginning of the 20$^{th}$ century, it was recognized that a medically useful anatomical image could be obtained when a film containing a radiation-sensitive silver halide emulsion is exposed to X-radiation passing through a patient. Soon thereafter, it was recognized that a patient's exposure to X-radiation could be decreased considerably by placing an intensifying screen adjacent the film. An intensifying screen contains an inorganic phosphor that absorbs X-radiation and promptly emits light to expose the film.

Thus, a radiographic phosphor panel (or screen) contains a layer of phosphor that is a crystalline material that responds to X-radiation in an imagewise fashion. Radiographic phosphor panels can be classified, based upon their phosphors, as prompt emission panels and image storage panels.

Intensifying screens are the most common prompt emission panels. They are used to generate visible light immediately upon exposure of the panel to X-radiation. A radiographic film is positioned to intercept the generated visible light generated and is commonly pressed against the panel within a light-tight cassette.

U.S. Pat. No. 3,859,527 (Luckey) introduced a new concept of storage phosphor imaging. In this imaging system, a prompt emitting phosphor was replaced with a storage ("stimulatable") phosphor that absorbs X-radiation and stores its energy until subsequently stimulated to emit light in an imagewise fashion as a function of the stored X-radiation pattern. Thus, the storage screen (now commonly referred to as an "image storage panel") performs both functions of absorbing X-radiation like an intensifying screen and an image storage function like the radiographic film. This has allowed the radiographic film to be eliminated as a required element. Storage phosphors are generally different from prompt emission phosphors.

Image storage panels can be used in computed radiography wherein the panel is first exposed to X-radiation to create a latent image. The panel is then stimulated with longer wavelength radiation resulting in emission of radiation of a third wavelength. For example, a laser having a red light or infrared beam can be scanned over an image storage panel, resulting in a green or blue light emission. The emitted light is collected in appropriate apparatus and the resulting signal is processed electronically to provide a final image.

Various inorganic phosphors have been investigated in the last 30 years for use in image storage panels. Some very useful phosphors include alkaline earth metal fluorohalide phosphors, and particularly those containing iodide, as described in U.S. Pat. No. 5,507,976 (Bringley et al.), U.S. Pat. No. 5,523,558 (Bringley et al.), and U.S. Pat. No. 5,639,400 (Roberts et al.).

Degradation of final images in phosphor panels from environmental factors (such as humidity) and discoloration, and particularly yellowing, has been a concern for many years. For example, U.S. Pat. No. 5,789,021 (Dooms et al.) describes the use of various phenolic antioxidants to reduce yellowing of rubbery binders.

There has not, however, been agreement as to the source of discoloration in phosphor panels. The sources of the discoloration are not always apparent but in some instances, the presence of water that hydrolyzes the phosphors may be one of the causes. In addition, other investigators have evaluated the effects of free halogen and particular free iodide that may cause yellowing seems to be most prevalent when the phosphors contain iodide because of the likely formation of iodine. Various stabilizers have been proposed to solve this problem as noted in U.S. Pat. No. 5,523,558 (noted above) including the incorporation of phosphites, organotin compounds, epoxy compounds, and specific metal salts of organic acids (see U.S. Pat. No. 4,900,641 of Kohda et al.), oxysulfur reducing agents, thiosulfates, and metal oxides. U.S. Pat. No. 5,630,963 (Leblans et al.) describes the use of N-heterocyclic compounds as stabilizers in phosphor screens. U.S. Pat. No. 5,639,400 (noted above) describes the use of monocyclic compounds containing a quaternary nitrogen atom in storage panels to increase the transmitted stimulated luminescence lost from released iodine.

PROBLEM TO BE SOLVED

The progress toward the protection of image storage panels against discoloration by moisture or free halogen has greatly accelerated the practical use of these elements in computer radiography. Despite these advances, new problems have emerged even when the image storage panels are not exposed to high humidity. New and unusual artifacts have been observed in such panels that have no obvious defects during visual inspection. In particular, some image storage panels used in hospital radiology facilities have been unexpectedly found to display "minus density artifacts" after imaging. These defects typically appear in the computer-rendered images and may be either shown as straight lines or highly curved lines. No obvious defects such as scratches in the overcoat layer or phosphor layer were found and there was no visible discoloration of the panel.

Investigation of the problems noted above has revealed that a number of disinfectants used in clinical environments may cause imaging defects in phosphor panels. Specifically, phosphor panels that have been lightly wiped with such disinfectants may appear undamaged to the unaided eye, but are subsequently found to exhibit the "minus density artifacts" after imaging.

In addition, degradation may be accelerated by exposure to radiation (especially UV radiation). Storage panels are normally exposed to such radiation from fluorescent lamps used to "erase" images from storage panels.

There remains a need for additional protection for image storage panels against discoloration or image defects beyond the teachings of the art. In particular, there is a need to protect iodide-containing storage phosphor panels.

SUMMARY OF THE INVENTION

The present invention provides a phosphor panel comprising a support having thereon a phosphor layer comprising an inorganic phosphor dispersed within a polymeric binder, the phosphor panel further comprising a primary or secondary amine having a pKa of 8.5 or more and a molecular weight of less than 10,000 daltons, and that is present in an amount of from about 0.01 to about 5% based on the weight of the inorganic phosphor.

In addition, this invention provides a phosphor panel comprising a support having thereon a phosphor layer comprising an inorganic phosphor dispersed within a polymeric binder, the phosphor panel further comprising a non-phosphite peroxide scavenger in an amount of from about 0.01 to about 5% based on the weight of the inorganic phosphor.

In preferred embodiments, the phosphor panel includes, in the same or different layers, both a primary or secondary amine as described herein and a peroxide scavenger (including phosphite and non-phosphite peroxide scavengers).

More preferred embodiments of this invention comprise an image storage panel comprising, in order: a support, an inorganic storage phosphor layer that comprises a barium fluorobromoiodide phosphor dispersed in a polymeric binder, and a protective overcoat disposed over the phosphor layer, the weight ratio of the phosphor to the polymeric binder being from about 10:1 to about 50:1, the protective overcoat comprising:

a primary or secondary amine that is ethanolamine, t-butylamino ethanol, dodecylamine, hexamethylenediamine, diethanolamine, or 2-(t-butylamino)ethanol that is present in an amount of from about 0.05 to about 2% based on the weight of the barium fluorobromoiodide phosphor, and a non-phosphite peroxide scavenger that is dithiaoctandiol, 4,4-thiobis(6-t-butyl-3-methylphenol, thiodiethylene bis(3,5-di-t-butyl4-hydroxy)hydrocinnamate, thioglycol, O-acetyl-α-tocopherol, 2,6-di-t-butyl4-methylphenol, 6-hydroxy-2,5,7,8-tetramethylchroman-2-carboxylic acid, distearyl thiodipropionate, dilauryl thiodipropionate, or 2,6-t-butyl-4-methylphenol that is present in an amount of from about 0.05 to about 2% based on the weight of the barium fluorobromoiodide phosphor.

This invention also provides a method of making a phosphor panel comprising:

A) applying to a support, a phosphor layer formulation comprising an inorganic phosphor, a polymeric binder, and one or more non-peroxide-generating organic solvents as the sole coating solvents, to provide a phosphor layer, and B) applying an overcoat formulation over the phosphor layer, the overcoat formulation comprising a binder and one or more non-peroxide-generating organic solvents as the sole coating solvents.

In preferred embodiments of this method, the phosphor panel also includes one or more primary or secondary amines or peroxide scavengers as described herein.

The present invention provides improved phosphor panels such as image storage panels, that are less susceptible to discoloration or "Minus density artifacts" caused from exposure to various disinfectants such as peroxides or peroxide-forming reagents or procedures. These advantages are achieved by incorporating specific primary or secondary amines into the phosphor panel. Such amines can be incorporated into the phosphor layer or subbing layer, but preferably, they are incorporated into a protective overcoat that is disposed over the phosphor layer and optional subbing layer. The incorporation of a peroxide scavenger into the phosphor panels can provide further protection.

The stabilization achieved by this invention can be provided in any type of phosphor panel including fluorescent intensifying screens (or prompt emitting panels), but preferably, the advantages are most useful in storage panels containing storage (or stimulable) phosphors containing iodine.

DETAILED DESCRIPTION OF THE INVENTION

Definitions:

The term "image storage panels" refer to phosphor screens that can "store" the exposing X-radiation for emission at a later time when the screen is irradiated (or "stimulated") with other radiation (usually visible light).

"Storage phosphors" refer to phosphor crystals that are capable of absorbing and storing X-radiation and emitting electromagnetic radiation of a second wavelength when exposed to or stimulated by radiation of still another wavelength.

Unless otherwise indicated, the term "phosphor panels" generally refers to all types of embodiments of the present invention including prompt emitting phosphor screens and stimulable or image storage phosphor screens.

The terms "front" and "back" refer to layers nearer to and farther from, respectively, a source of X-radiation.

The term "peroxide" refers to a compound having the characteristic peroxo —O—O— (oxygen-to-oxygen) bond. Peroxides include the inorganic hydrogen peroxide ($H_2O_2$) as well as organic hydroperoxides.

The term "rare earth" is used to indicate chemical elements having an atomic number of 39 or 57 through 71.

*Research Disclosure* is published by Kenneth Mason Publications, Ltd., Dudley House, 12 North St., Emsworth, Hampshire P010 7DQ England. This publication is also available from Emsworth Design Inc., 147 West 24th Street, New York, N.Y. 10011.

Phosphor Panels:

While the invention can be used to advantage in various types of phosphors panels as noted above, the following discussion will be focused on the image storage panels that are the preferred embodiments of this invention. Many of the details provided below could be adapted by one skilled in the art for use in prompt emitting phosphor panels or fluorescent intensifying screens.

The image storage panels are typically designed to absorb X-radiation and to emit electromagnetic radiation having a wavelength greater than 300 nm. In particular, the image storage panel comprises an inorganic storage phosphor absorbs radiation having a wavelength of from about 0.01 to about 10 nm and emits radiation having a wavelength of from about 300 to about 650 nm upon stimulation. Preferably, it emits radiation at a wavelength of from about 350 to about 450 nm. These image storage panels can take any convenient form providing they meet all of the usual requirements for their use in computed radiography. Examples of construction, composition, methods of preparation, and use of image storage panels are described, for example, in U.S. Pat. No. 4,380,702 (Takahashi et al.), U.S. Pat. No. 4,926,047 (Takahashi et al.), U.S. Pat. No. 5,077,144 (Takahashi et al.), U.S. Pat. No. 5,401,971 (Roberts), U.S. Pat. No. 5,427,868 (Bringley et al.), U.S. Pat. No. 5,464,568 (Bringley et al.), U.S. Pat. No. 5,507,976 (noted above), U.S. Pat. No. 5,523,558 (noted above), and U.S. Pat. No. 5,639,400 (noted above), and Canadian 1,246,399 (Terumi et al.), the disclosures of which are incorporated herein by reference. One or more phosphor layers contain particles of one or more "storage" phosphors and one or more suitable binders. The phosphor layer(s) are sometimes called luminescent layer(s).

Crystals of any useful storage phosphor can be used, singly or in mixtures, and preferably, it contains iodine. This would include, but not limited to, alkaline earth metal fluorohalide storage phosphors containing iodine and alkali metal storage phosphors containing iodine. Mixtures of each or both types of these phosphors can also be used. The optimal type and amount of phosphor would be readily apparent to a skilled worker using routine experimentation. Storage phosphors can be located in one or more phosphor layers and where there are multiple phosphor layers, the iodine-containing phosphor can be present in only one of those layers if desired. Thus, phosphors lacking iodine can also be present.

In particularly useful embodiments of the invention, the storage phosphor is a product of firing starting materials comprising optional oxide and a combination of species characterized by the following Structure (I):

wherein M is Mg, Ca, Sr, Ba, or combinations thereof,
X is Cl, Br, or combinations thereof,
$M^a$ is Na, K, Rb, Cs, or combinations thereof,
$X^a$ is F, Cl, Br, I, and combinations thereof,
A is Eu, Ce, Sm, Th, or combinations thereof,
Q is BeO, MgO, CaO, SrO, BaO, ZnO, $Al_2O_3$, $La_2O_3$, $In_2O_3$, $SiO_2$, $TiO_2$, $ZrO_2$, $GeO_2$, $Nb_2O_5$, $Ta_2O_5$, $ThO_2$, or combinations thereof,
D is V, Cr, Mn, Fe, Co, Ni, or combinations thereof,
z is from 0.0001 to 1,
u is from 0 to 1,
y is from 0.0001 to 0.1,
e is from 0 to 1, and
t is from 0 to 0.01.

The amounts represented by "z", "u", "y", "e", and "t" are molar amounts. The same designations appearing elsewhere in this application have the same meanings unless otherwise specified. Groups of components, for example the components identified as "M", are understood to represent mixtures of the components in the group.

In Structure (I), preferably, M is Ba, X is Br, $M^a$ is Na, K, or a combination thereof, $X^a$ is F or Br, A is Eu, Q is $SiO_2$ or $Al_2O_3$, and t is 0.

Particularly useful phosphors represented by Structure (I) are europium activated barium fluorobromoiodides.

Other useful storage phosphors are divalent alkaline earth metal fluorohalide phosphors containing iodine that are the products of firing an intermediate, comprising an oxide and combination of species as represented by the following Structure (II):

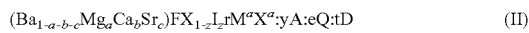

wherein X, $M^a$, $X^a$, A, Q, D, e, t, z, and y are as defined above for Structure (I), the sum of a, b, and c is from 0 to 0.4, and r is from $10^{-6}$ to 0.1. Preferably, $M^a$ is sodium or potassium. These phosphors and methods of making them are defined in more detail in U.S. Pat. No. 5,464,568 (noted above).

Useful storage phosphors can also be produced using an oxosulfur reducing agent containing phosphor intermediate as described in U.S. Pat. No. 5,507,976 (noted above).

The phosphor layer(s) generally include one or more polymeric binders to provide structural coherence. Binders are generally chosen from a wide variety of known organic polymers that are transparent to X-radiation, stimulating, and emitting radiation. Binders commonly used include, but are not limited to, sodium o-sulfobenzaldehyde acetal of poly(vinyl alcohol), chlorosulfonated poly(ethylene), a mixture of macromolecular bisphenol poly(carbonates), cellulose acetate butyrate, styrene-butadiene copolymers, copolymers comprising bisphenol carbonates and poly(alkylene oxides), aqueous ethanol soluble nylons, poly(alkyl acrylates and methacrylates), and copolymers of poly(alkyl acrylates and methacrylates with acrylic and methacrylic acid), poly(vinyl butyral), and poly(urethane) elastomers. Particularly useful binders include poly(urethanes) such as those commercially available under the trademarks ESTANE (Goodrich Chemical), PERMUTHANE (ICI), and CARGILL (Cargill, Inc.). The binders used in the phosphor layer(s) can be same or different as the binders used in the protective overcoat.

Thinner phosphor layers and sharper images are realized when a high weight ratio of inorganic phosphor to binder is used. Generally, the weight ratio of inorganic phosphor to binder is at least 7:1 and preferably at least 10:1, and up to 50:1 and preferably up to 30:1. The dry thickness of the phosphor layer is generally from about 10 to about 1000 μm and preferably from about 50 to about 500 μm. The coverage of phosphor in the dried phosphor layer is generally from about 5 to about 5000 g/m², and preferably from about 150 to about 1500 g/m².

The phosphor layer may also include blue dyes or pigments (such as copper phthalocyanine and ultramarine blue) to absorb some stimulating radiation and to reflect emitted light, as well as ultraviolet light absorbing compounds. These components also can be incorporated into a separate absorbing layer under the phosphor layer(s).

Alternatively, the phosphor layer(s) can be disposed on a reflective underlayer or support that contains barium sulfate, titanium dioxide, or other white pigments. Further details about reflective supports are provided below.

An optional but preferred component of the phosphor panels is a protective overcoat disposed over the phosphor layer. This protective overcoat can comprise one or more polymer binders normally used for this purpose, such as a cellulose ester (for example cellulose acetate) and other polymers that provide the desired mechanical strength and scratch and moisture resistance. The protective overcoat can extend over and be used to seal the edges of the phosphor layer(s). As noted below, the protective overcoat can include the desired primary or secondary amines as well as the peroxide scavengers described below. The protective overcoat is preferably disposed directly on the phosphor layer(s), but in some embodiments, a polymeric interlayer may be present between the protective overcoat and the one or more phosphor layers.

Other useful protective overcoat materials are also described in U.S. Pat. No. 5,401,971 (noted above). In these embodiments, the protective layer includes a miscible blend of "first" and "second" polymers. This miscible blend can include two or more of each type of polymer. The first polymer is a poly(vinylidene fluoride-co-tetrafluoroethylene) wherein the recurring units derived from the vinylidene fluoride monomer can compose from about 20 to about 80 mol % (preferably from about 40 to about 60 mol %) of the total recurring units in the polymer, and the remainder of the recurring units are derived from tetrafluoroethylene. These polymers are sometimes identified in the literature as "$PVF_2$" and can be prepared using known monomeric reactants and polymerization conditions. Alternatively, they can be commercially obtained from a number of sources. For example, $PVF_2$ is available as Kynar 7201 from Atofina Chemicals, Inc. (Philadelphia, Pa.).

The second polymer is a poly(alkyl acrylate or methacrylate). Examples of such polymers include, but are not limited to, poly(methyl acrylate), poly(methyl methacrylate), poly(ethyl acrylate), poly(ethyl methacrylate), and poly(chloromethyl methacrylate). The poly(1- or 2-carbon alkyl acrylates or methacrylates) including, but not limited to, poly(methyl methacrylate) and poly(ethyl methacrylate) are preferred. These polymers are readily prepared using known monomeric reactants and polymerization conditions, and can also be obtained from several commercial sources. For example, poly(methyl methacrylate) or "PMMA" can be obtained as Elvacite 2051 from ICI Acrylics (Memphis, Tenn.).

Thus, a preferred protective overcoat comprises a miscible blend of a first polymer that is poly(vinylidene fluoride-co-tetrafluoroethylene) and a second polymer that is poly(methyl methacrylate) or poly(ethyl methacrylate) at a weight ratio of first polymer to the second polymer of from about 70:30 to about 10:90.

The protective overcoat can also include various matte particles, lubricants, micronized waxes, and surfactants, if desired. Useful matte particles include both inorganic and organic particles that generally have a particle size of from about 4 to about 20 μm. Examples of suitable matte particles include, but are not limited to, talc, silica particles or other inorganic particulate materials, and various organic polymeric particles that are known for this purpose in the art. The amount of matte particles present in the protective overcoat layer can be up to 10% (based on total layer dry weight).

The protective overcoat may also include one or more lubricants in an amount of up to 10% (based on total dry layer weight). Useful lubricants can be either in solid or liquid form and include such materials as surface active agents, silicone oils, synthetic oils, polysiloxane-polyether copolymers, polyolefin-polyether block copolymers, fluorinated polymers, polyolefins, and what are known as micronized waxes that are preferred.

The protective overcoat generally has a dry thickness of from about 0.1 to about 100 μm, and a preferred dry thickness of from about 1 to about 50 μm.

The phosphor panel includes one or more primary or secondary amines as stabilizers in one or more layers. These stabilizers can be in any of the phosphor layer(s), protective overcoat, or subbing layer, or they can be in multiple locations. Preferably, the primary or secondary amine stabilizer is in the protective overcoat, as well as a peroxide scavenger as described below.

Useful primary or secondary amines can be defined as aliphatic amines having one or two hydrogen atoms attached to the nitrogen atom and a pKa of 8.5 or greater and preferably of 10 or more. The primary and secondary amines are relatively small molecules, that is, they generally have a molecular weight of less than 10,000 daltons, preferably at least 50 and up to 1000, and more preferably 250 daltons or less.

By "primary" amine, we mean an amine having only one valence that is substituted with a suitable cyclic or acyclic aliphatic group. By "secondary" amine, we mean an amine having two valences substituted with a suitable cyclic or acyclic aliphatic group. The secondary amines can include cyclic amines, but preferably the secondary amines are non-cyclic (or acyclic) compounds.

Useful primary amines include, but are not limited to, alcoholamines (such as ethanolamine and iso-propanolamine), alkylamines (such as dodecylamine and hexamethylenediamine). Non-cyclic secondary amines are more preferred and include, but are not limited to, dialcoholamines [such as diethanolamine, di-n-propanolamine, and 2-(t-butylamino)ethanol] and dialkylamines (such as diethylamine and di-dodecylamine). Mixtures of the various primary and/or secondary amines can also be used.

The primary or secondary amine is present generally in an amount of from about 0.01 to about 5% based on the weight of inorganic phosphor. Preferably, it is present in an amount of from about 0.05 to about 2% based on the weight of inorganic phosphor, and more preferably from about 0.05 to about 1% based on the weight of inorganic phosphor. Tertiary and quaternary amines are not useful in this invention.

Useful primary and secondary amines can be generally obtained from various commercial sources including Aldrich Chemical Company.

In some embodiments, the phosphor panels of this invention include one or more non-phosphite peroxide scavengers. For example, thioether compounds represented by the following Structure (III) are useful as non-phosphite peroxide scavengers:

$$R^1—(S—R^3)_m—S—R^2 \quad (III)$$

wherein $R^1$ and $R^2$ are independently hydrogen or an alkyl, cycloalkyl, or aryl group, or together they may form an aliphatic ring, $R^3$ is an alkylene group, and m is 0 to 10 (preferably 0, 1, or 2).

More particularly, $R^1$ and $R^2$ are independently hydrogen, a substituted or unsubstituted alkyl group having 1 to 12 carbon atoms (both branched and linear alkyl groups, and benzyl, being included), substituted or unsubstituted cycloalkyl groups having 5 to 10 carbon atoms in the cyclic ring, or substituted or unsubstituted carbocyclic aryl groups (such as phenyl, naphthyl, and substituted derivatives). In addition, $R^1$ and $R^2$ can be joined to form a substituted or unsubstituted 5- to 12-membered aliphatic ring containing carbon, sulfur, and optionally other heteroatoms.

$R^3$ is a substituted or unsubstituted alkylene group having 1 to 10 carbon atoms (either linear or branched), and can be multiple alkylene groups connected by various heteroatom linkages such as oxy and thio groups.

In some embodiments, the compounds of Structure (III) comprise substituents that are substituted with one or more hydrophilic groups such as carboxy, sulfo, hydroxy, (poly) ethyleneoxy groups, or a group containing a basic nitrogen. Examples of such compounds are described in U.S. Pat. No. 6,589,635 (Suzuki et al.) that is incorporated herein by reference.

Examples of useful non-phosphite peroxide scavengers include but are not limited to, thioethers such as dithiaoctanediol, 4,4-thiobis(6-t-butyl-3-methylphenol, thiodiethylene bis(3,5-di-t-butyl-4-hydroxy) hydrocinnamate, and thioglycol, O-acetyl-α-tocopherol (Vitamin E acetate), 2,6-di-t-butyl-4-methylphenol, 6-hydroxy-2,5,7,8-tetramethylchroman-2-carboxylic acid, thioesters such as distearyl thiodipropionate and dilauryl thiodipropionate, and 2,6-t-butyl-4-methylphenol, or mixtures thereof. Dithiaoctanediol is most preferred as a peroxide scavenger.

The peroxide scavenger (phosphite or non-phosphite compound) can be present generally in a molar amount of from about 0.01 to about 5% based on the weight of the inorganic phosphor. Preferably, the amount is from about 0.05 to about 2% based on the weight of inorganic phosphor.

Various peroxide scavengers can be obtained from a number of commercial sources including Aldrich Chemical Company.

The primary and secondary amines or non-phosphite peroxide scavengers described herein can also be used in combination with other stabilizing compounds or antioxidants such as the phenolic compounds described for example in U.S. Pat. No. 5,789,021 (noted above), and compounds containing an epoxy group ("epoxy compounds"), phosphites ("phosphorus chelates"), and organotin compounds described for example in U.S. Pat. No. 4,900,641 (noted above) that is incorporated herein by reference.

The phosphor panels have a suitable flexible or rigid support on which the phosphor layer(s) and optional protective overcoat are disposed. Flexible supports can be stiff papers but are most commonly polymeric in composition and include such high dimensionally stable films as poly(ethylene terephthalate) film supports. The support can also include one or more polymeric layers disposed on or laminated to a rigid metal sheet such as a copper or aluminum sheet.

Metal layers may enhance reflection. Paper supports are also used for certain applications. For the highest attainable imaging speed, a white support may be used. Such supports include a polymer or paper substrate that is "loaded" or coated with titania or barium sulfate. Other reflective supports include those with microlenslets as described in U.S. Pat. No. 4,912,333 (noted above) that is incorporated herein by reference.

U.S. Pat. No. 6,652,996 (Steklenski et al.) that is incorporated herein by reference describes polymeric multi-layer reflectors useful as supports in phosphor panels. These multi-layer reflectors exhibit a different level of reflectance of light depending upon the angle of light incidence.

In some embodiments, the support is a single- or multi-layer reflective sheet. At least one of the layers of this sheet is a reflective substrate that comprises a continuous polyester or poly(lactic acid) first phase and a second phase dispersed within the continuous polyester first phase. This second phase comprises microvoids containing barium sulfate or other reflective inorganic particles. Such support materials are described, for example, in U.S. Pat. No. 6,846,606 (Laney et al.) and U.S. Patent Application Publication 2005-0098738 (Laney et al.), both incorporated herein by reference.

Dyes and pigments (including carbon black) are commonly loaded into or coated onto supports to enhance absorption or reflectance of light. Air can be trapped in supports to reflect ultraviolet and visible radiation. Subbing layers may be coated onto supports to enhance adhesion to the phosphor layer(s) and can include one or more of the noted amines or antioxidants.

Alternatively, a light-reflecting layer may be incorporated between the support and the phosphor layer(s) to enhance the output of light from photostimulation. Such a light-reflecting layer may contain white pigment particles (such as titania or barium sulfate) dispersed in a suitable binder, or be made of a vapor-deposited metal layer (such as an aluminum layer), or it may be a colored pigment layer absorbing stimulating radiation but reflecting emitted radiation.

Anticurl layers may be applied to the backside of the support to balance the mechanical forces exerted by the layers coated on the frontside of the image storage panel. Materials used for anticurl layers are well known in the art.

In some embodiments, the phosphor panel comprises a suitable storage phosphor layer disposed on a polyester film support, and an overcoat layer as described above is disposed over the phosphor layer. Between the phosphor layer and the support is a black absorbing (or anti-reflecting) layer comprising black dyes or carbon black pigments dispersed within a suitable film-forming binder (such as polyurethane). If desired, an adhesion-promoting subbing layer (water-dispersible polymer or polymer latex) can be used to adhere the black absorbing layer to the support. On the backside of the support is a suitable anti-curl layer that can also include black dyes or carbon black pigments dispersed within a polycarbonate binder. The anti-curl layer can also include lubricant such as a micronized wax and matte particles (either organic polymer beads or inorganic particles).

Other useful embodiments of the present invention have a blue absorbing layer between the phosphor layer and the support (or subbing layer) instead of the black absorbing layer described above. The blue absorbing layer can include one or more suitable blue dyes or pigments that have a maximum absorbance at from about 500 to about 700 nm and minimal absorbance at from about 350 to about 450 nm. Suitable pigments include copper phthalocyanine and ultramarine blue pigments. Water-soluble blue dyes are also useful. One particularly useful blue dye is 1,4-benzenedisulfonic acid, 2-(3-acetyl-4-(5-(3-acetyl-1-(2,5-disulfophenyl)-1,5-dihydro-5-oxo-4H-pyrazol-4-ylidene)-1,3-. The blue dye or pigment is dispersed in a suitable film-forming, water-soluble binder such as poly(vinyl alcohol)s, hydroxymethyl cellulose, and hydroxypropyl cellulose. Solvent-soluble binders such as cellulose nitrate may also be used.

Alternatively, a blue absorbing layer can be provided on the backside of the support. This backside support can also serve as the anti-curl layer or be a separate layer underneath the anti-curl layer.

The phosphor panels are formed using conventional coating techniques. Phosphor powder and other addenda are mixed with a solution of a resin binder material and the resulting formulation is coated by suitable means such as spray coating, dip-coating, doctor blade coating, and slot die coating, onto a substrate (subbed or unsubbed support). Coating solvents are removed by evaporation. Suitable manufacturing techniques are described for example in U.S. Pat. No. 4,505,989 (Umemoto et al.), incorporated herein by reference. A protective overcoat formulation is preferably coated over the phosphor layer(s) using the same or similar solvents.

For example, the phosphor layer formulation comprising an inorganic phosphor, a polymeric binder, and a non-peroxide-generating organic solvent can be applied to the support to provide a phosphor layer. A protective overcoat formulation can be applied over the phosphor layer, which protective overcoat formulation comprises a binder and preferably a non-peroxide-generating organic solvent. The non-peroxide-generating organic solvents include but are not limited to, methyl acetate, ethyl acetate, propyl acetate, n-butyl acetate, methanol, ethanol, n-propanol, n-butanol, methylene chloride, acetone, or mixtures of two or more of these solvents. Methyl acetate is a preferred solvent for the coating the phosphor layer and protective overcoat formulations. Preferably, the phosphor panels are free of peroxides and peroxide-generating compounds including coating solvents that generate peroxides, meaning that residual amounts of such compounds are present in the phosphor panels at less than 108 mg/m$^2$ and preferably at less than 21.6 mg/m$^2$.

It may also be desirable to improve handling durability of the image storage panels by beveling the phosphor layer at the edges of the panel as described for example in U.S. Pat. No. 4,511,802 (Teraoka). The angle of the bevel can be between 30 and 60 degrees. A standard edge seal comprising the blend of polymers described for the overcoat layer can then be placed over the beveled edges.

Imaging and use of the image storage panels can be achieved using known conditions and apparatus. Representative conditions and use are provided in the examples below.

The following examples are presented for illustration and the invention is not to be interpreted as limited thereby.

Methods and Materials for Examples

Phosphors:

The X-ray storage phosphor is an europium-activated barium fluorobromoiodide type (see U.S. Pat. No. 5,523,558, Col. 10, line 10 for details). All phosphors also contained a small amount (2.0% by weight) of an inorganic oxysulfur stabilizing agent ($BaS_2O_3$).

Phosphor:Support Composite:

The phosphor layer was coated as a dispersion in a solvent system of 93:7 methylene chloride:methanol (ratio by weight) containing Permuthane U-6366 polyurethane as a polymeric binder with the ratio of phosphor to polymer as 15:1 by weight. The phosphor layer was coated onto a flexible poly(ethylene terephthalate) support using a slot die coating method and subsequently dried to remove solvent. For all examples, the total dry coverage of the phosphor layer was 864 g/m². In addition, an anti-halation layer comprised of carbon black and cellulose acetate was then applied to the opposite side of the support at a dry coverage of 47.5 g/m². After drying, the composite film of phosphor layer and polyester support was wound into rolls and immediately stored in a dry box with desiccant (less than 10% relative humidity) until it was used for all of the examples.

Protective Overcoats:

For each image storage panel, the polymeric composition for the overcoat was a mixture of poly(methyl methacrylate) (PMMA) and poly(vinylidene fluoride) (PVF) (ratio of PMMA to PVF was 7:3 by weight). The overcoat formulations were applied by first dissolving the polymers in an suitable organic solvent as noted, coating the formulation onto the phosphor layer by knife blade or slot die method as noted, and finally drying the coatings to a residual solvent level of less than 1% by weight of the final dry overcoat. In addition, some overcoat formulations also contained the various amines or peroxide scavengers noted below. All overcoat formulations are applied to provide a total dry overcoat coverage of 18.4 g/m².

Peroxide Test:

Samples of image storage panels are evaluated with a wipe test to simulate accidental panel cleaning with peroxide-containing agents. The photographic speed of each panel was measured before and after the wipe test, relative to an non-exposed "control" panel. A cotton swab was soaked with iso-propanol that was undoped or doped with various levels of hydrogen peroxide (10 or 100 ppm of hydrogen peroxide). The isopropanol solution was then applied to the screen and allowed to dry. This procedure was repeated for a total of five applications with a freshly soaked swab for each wipe. After drying, image storage panels were left for 24 hours at ambient conditions and measured for speed.

UV Exposure Test:

Samples of image storage panels are evaluated with ultraviolet (UV) light to simulate harsh erase conditions as well as accidental exposure to UV light or sunlight. The speed of each panel was measured before and after light exposure relative to an unexposed control panel. After an initial speed measurement, the panels were exposed to UV by placing them directly under a lamp housing containing two black fluorescent bulbs (EIKO F15T8/BLB, 15 Watts). The panels were then placed 2.54 cm from the lamps. The use of black lights exaggerated the exposure of the screen to ultraviolet light when compared to light emitted from fluorescent lamps used to erase screens in conventional scanners (fluorescent bulbs from Sylvania DuluxL 55DL/830). A 24-hour exposure is roughly the equivalent to 30,000 erasure cycles or 1.5× the amount of erasure time experienced by the panel over its expected lifetime. After the UV exposure, the panels were exposed to X-radiation, read and measured for speed.

Speed Measurement:

Samples of the image storage panels as well as an internal "control" standard were exposed to X-radiation and read for initial speed measurements. The X-ray exposure conditions were 80 kVp and 15 mA using a 0.2 mm thick copper and a 1 mm thick aluminum filter at a source to image distance of 183 cm. Prior to exposure, all panels were erased in a commercial Direct View CR800 reader using the standard erase cycle. After exposure to X-radiation, the panels were then scanned in the Direct View CR800 reader by stimulating it with a 633 nm helium-neon laser. The stimulated emulsion was collected by an array of photomultiplier tubes in the reader and the speed for individual panels was determined. After this initial speed measurement, panels were exposed to the peroxide or UV tests described above and subsequently erased, exposed to X-radiation, and scanned using an internal control standard as described above to obtain a final speed measurement. Speed retention is the ratio of "final" and "initial" speed values.

| Tested Amines/Peroxide Scavengers: | | |
|---|---|---|
| | pH | pKa |
| Primary Amines | | |
| Ethanolamine (EA) | 10 | 9.5 |
| Dodecylamine (DA) | 11 | 10.6 |
| Hexamethylenediamine (HDA) | 12 | 11.9 |
| Secondary Amines | | |
| Diethanolamine (DEA) | 11 | 10.8 |
| 2-(Butylamino)ethanol (BEA) | 11 | 10.7 |
| Ringed Amines (Comparative Examples 1 & 2) | | |
| 2-Ethyl-2-oxazoline (EO) | 8 | 8.1 |
| Imidazole | 7 | 7.0 |
| Peroxide Scavengers | | |
| Dithiaoctandiol (DTOD) | | |
| 2,6-Di-tert-butyl-4-methylphenol (BHT) | | |
| Vitamin E acetate (E) | | |

Control:

This example describes an image storage panel that does not contain the primary or secondary amines or peroxide scavengers described for this invention. The solvent used in the overcoat formulation was MEK. Results of the UV and peroxide tests for this control screen are given in TABLE I below (Control). As shown in TABLE I, the speed of the Control panel was unchanged by the iso-propanol wiping when the iso-propanol contained 10 ppm or less of peroxide and speed values were maintained at near 100% of the original values. However, after wiping with iso-propanol containing 100 ppm of peroxide, the speed of the Control image storage panel dropped to only 60% of the original speed. Following the exposure to UV light, the Control image storage panel retained only 30% of the original speed.

EXAMPLE 1

This example describes the effect of the addition of primary amines to the protective overcoat of the image storage panels of this invention. Results from the exposure to UV light and the peroxide test are given in TABLE I (Samples 1-1 through 1-7). As shown in TABLE I, all of the primary amines greatly improved the speed retention of the image storage panels following the UV exposure. For example, the retained speed improved to more than 84% of the original speed with the use of all primary amines tested regardless of concentration. This is more than double the value found for the Control image storage panel that contained no primary amine and had a retained speed of only 30% (see TABLE I). In addition, the retained speed improved to >90% after a 100 ppm peroxide test when compared to the Control image storage panel value of only 61% (see TABLE I).

EXAMPLE 2

This example describes the effect of the addition of secondary amines to the protective overcoat of the image storage panels of this invention. Results from the exposure to UV light and the peroxide test are summarized in TABLE I (Samples 2-1 through 2-6). As shown in TABLE I, all of the secondary amines greatly improved the speed retention of the image storage panels following the UV exposure. For example, retained speed improved to approximately 85% of the original speed with the use of all secondary amines tested. This is more than double the value found for the Control image storage panel that had no primary or secondary amine and had a retained speed of only 30% (see TABLE I). In addition, the retained speed improved to >90% after a 100 ppm peroxide test when compared to the Control image storage panel value of only 61% (see TABLE I).

EXAMPLE 3

This example describes the effect of the addition of a secondary amine (DEA) to the protective overcoat in a coating formulation that utilizes the non-peroxide forming solvent methyl acetate (MA). Results from the exposure to UV light and the peroxide test are given in TABLE I (Samples 3-1 through 3-3). As shown in TABLE I, these panel samples are nearly unaffected by exposure to UV light and wiping with a peroxide-containing solvent. All image storage panels tested retained nearly 100% of original speed values after both the exposure to UV and the peroxide test regardless of the peroxide concentration. This is a dramatic improvement when compared with the Control image storage panel prepared using MEK as a solvent and without the secondary amine that showed only 30% and 60% retained speed for the exposure to UV and 100 ppm peroxide tests, respectively.

EXAMPLE 4

This example describes the effect of the addition of a thioether as a peroxide scavenger (DTOD) to the protective overcoat of an image storage panel that does not contain a primary or secondary amine. Results from exposure to UV light and the peroxide test are given in TABLE I (Samples 4-1 through 4-3). As shown in TABLE I, use of the thioether peroxide scavenger provided some improvement in the speed retention of the image storage panels following the UV exposure and peroxide tests. For the peroxide test, the retained speed improved to 70-80% of the original speed when compared to the Control image storage panel value of only 60% after treatment with 100 ppm of peroxide (see TABLE I). For the UV exposure test, the retained speed improved to 45-65% of the original speed when compared to the Control image storage panel value of only 30%.

EXAMPLE 5

This example describes the effect of the addition of BHT and Vitamin E as peroxide scavengers to the protective overcoat of image storage panels that do not contain a primary or secondary amine. Results from exposure to UV light and the peroxide test are given in TABLE I (Samples 5-1 through 5-6). As shown in TABLE I, use of both of these compounds provided some improvement in the speed retention of the image storage panels following the UV exposure and peroxide tests. For the peroxide test, the retained speed improved to nearly 80% of the original speed when compared to the Control image storage panel value of only 60% after treatment with 100 ppm of peroxide (see TABLE I). For the UV exposure test, the retained speed improved to approximately 50% of the original speed when compared to the Control image storage panel value of only 30%.

EXAMPLE 6

This example describes the effect of the addition of a secondary amine (DEA) as well as the addition of a thioether (DTOD) peroxide scavenger to the protective overcoat in a coating formulation that utilizes the non-peroxide forming solvent methyl acetate (MA). Results for exposure to UV light and the peroxide test are given in TABLE I (6-1 through 6-3). As shown in TABLE I, these panel samples were nearly unaffected by exposure to UV light and wiping with a peroxide-containing solvent. All samples retained nearly 100% of the original speed values after both the exposure to UV and peroxide tests regardless of peroxide concentration. This is a dramatic improvement when compared with the Control image storage panel prepared with MEK as a solvent and without the amine that showed only 30% and 60% retained speed for the exposure to UV and 100 ppm peroxide tests, respectively.

EXAMPLE 7

This example describes the effect of the use of a non-peroxide forming solvent methyl acetate (MA) in the coating formulation for the protective overcoat to make a storage panel containing no primary or secondary amines or peroxide scavengers. Results for the exposure to UV light and the peroxide tests are given in TABLE I (7-1). As shown in TABLE I, this panel sample was nearly unaffected by exposure to UV light, retaining more than 90% of the original speed value after UV exposure. However, resistance to peroxides was poor. For example, retained speed was low at only 65%, which is close to the speed of the control panel value (~60%).

COMPARATIVE EXAMPLE 1

This example describes the effect of the addition of a cyclic (or tertiary) amine compound (2-ethyl-2-oxazoline, EO) to the protective overcoat at the relatively high coverage of 1.836 g/m$^2$. Results from the exposure to UV light and peroxide test are given in TABLE I (C1). As shown in TABLE I, use of EO provided no improvement over the Control image storage panel in either the exposure to UV or 100 ppm peroxide test.

COMPARATIVE EXAMPLE 2

This example describes the effect of the addition of a cyclic (or tertiary) amine compound, imidazole, to the protective overcoat at the relatively high coverage of 1.836 g/m². Results for the exposure to UV light and peroxide test are given in TABLE (C2). As shown in TABLE I, use of imidazole provided no improvement over the Control panel in either the exposure to UV or 100 ppm peroxide test.

TABLE I

| PANEL | SOLVENT | AMINE | AMINE (mg/m²) | THIO-ETHER | THIO-ETHER (mg/m²) | SPEED RETENTION UV (%) | SPEED RETENTION 0 ppm (%) | SPEED RETENTION 10 ppm (%) | SPEED RETENTION 100 ppm (%) |
|---|---|---|---|---|---|---|---|---|---|
| Control | MEK | None | 0 | 0 | 0 | 30 | 100 | 98 | 61 |
| 1-1 | MEK | EA | 1836 | 0 | 0 | 92 | 100 | 98 | 97 |
| 1-2 | MEK | EA | 918 | 0 | 0 | 84 | 99 | 96 | 99 |
| 1-3 | MEK | EA | 454 | 0 | 0 | 85 | 100 | 100 | 92 |
| 1-4 | MEK | DA | 1836 | 0 | 0 | 88 | 99 | 96 | 97 |
| 1-5 | MEK | DA | 918 | 0 | 0 | 86 | 99 | 100 | 98 |
| 1-6 | MEK | DA | 454 | 0 | 0 | 89 | 100 | 99 | 94 |
| 1-7 | MEK | HA | 918 | 0 | 0 | 86 | 99 | 100 | 94 |
| 2-1 | MEK | DEA | 1836 | 0 | 0 | 87 | 99 | 96 | 98 |
| 2-2 | MEK | DEA | 918 | 0 | 0 | 82 | 97 | 100 | 95 |
| 2-3 | MEK | DEA | 454 | 0 | 0 | 84 | 97 | 96 | 93 |
| 2-4 | MEK | BEA | 1836 | 0 | 0 | 86 | 99 | 96 | 94 |
| 2-5 | MEK | BEA | 918 | 0 | 0 | 84 | 96 | 95 | 95 |
| 2-6 | MEK | BEA | 454 | 0 | 0 | 84 | 100 | 97 | 91 |
| 3-1 | MA | DEA | 1836 | 0 | 0 | 100 | 99 | 97 | 97 |
| 3-2 | MA | DEA | 918 | 0 | 0 | 100 | 98 | 96 | 97 |
| 3-3 | MA | DEA | 454 | 0 | 0 | 99 | 100 | 99 | 98 |
| 4-1 | MEK | 0 | 0 | DTOD | 1836 | 67 | 100 | 100 | 82 |
| 4-2 | MEK | 0 | 0 | DTOD | 918 | 66 | 99 | 98 | 81 |
| 4-3 | MEK | 0 | 0 | DTOD | 454 | 58 | 100 | 99 | 76 |
| 5-1 | MEK | 0 | 0 | BHT | 1836 | 56 | 98 | 97 | 79 |
| 5-2 | MEK | 0 | 0 | BHT | 918 | 49 | 100 | 99 | 74 |
| 5-3 | MEK | 0 | 0 | BHT | 454 | 51 | 99 | 100 | 71 |
| 5-4 | MEK | 0 | 0 | E | 1836 | 52 | 100 | 97 | 78 |
| 5-5 | MEK | 0 | 0 | E | 918 | 54 | 98 | 98 | 81 |
| 5-6 | MEK | 0 | 0 | E | 454 | 45 | 99 | 95 | 77 |
| 6-1 | MA | DEA | 1836 | DTOD | 918 | 99 | 99 | 100 | 98 |
| 6-2 | MA | DEA | 918 | DTOD | 918 | 100 | 100 | 96 | 100 |
| 6-3 | MA | DEA | 454 | DTOD | 918 | 100 | 100 | 97 | 99 |
| 7-1 | MA | 0 | 0 | 0 | 0 | 92 | 98 | 96 | 65 |
| C1 | MEK | EO | 1836 | 0 | 0 | 35 | 100 | 97 | 60 |
| C2 | MEK | Imidazole | 1836 | 0 | 0 | 32 | 100 | 98 | 65 |

The invention has been described in detail with particular reference to certain preferred embodiments thereof, but it will be understood that variations and modifications can be effected within the spirit and scope of the invention.

The invention claimed is:

1. A phosphor panel comprising a support having thereon a phosphor layer comprising an inorganic phosphor dispersed within a polymeric binder, said phosphor panel further comprising a primary or secondary amine having a pKa of 8.5 or more and a molecular weight of less than 10,000 Daltons, and that is present in an amount of from about 0.01 to about 5% based on the weight of said inorganic phosphor.

2. The phosphor panel of claim 1 further comprising a protective overcoat disposed over said phosphor layer and said primary or secondary amine is present in said protective overcoat.

3. The phosphor panel of claim 1 wherein said primary or secondary amine has a pKa of 10 or more.

4. The phosphor panel of claim 1 wherein said primary or secondary amine is a non-cyclic amine compound.

5. The phosphor panel of claim 1 wherein the weight ratio of said inorganic phosphor to said polymeric binder is at least 10:1.

6. The phosphor panel of claim 1 wherein the molecular weight of said primary or secondary amine is 250 daltons or less.

7. The phosphor panel of claim 1 further comprising a peroxide scavenger that is present in an amount of from about 0.01 to about 5% based on the weight of said inorganic phosphor.

8. The phosphor panel of claim 7 wherein said peroxide scavenger is represented by the following Structure (III):

$$R^1-(S-R^3)_m-S-R^2 \quad \text{(III)}$$

wherein $R^1$ and $R^2$ are independently hydrogen, an alkyl, cycloalkyl, or aryl group, or together may form an aliphatic ring, $R^3$ is an alkylene group, and m is 0 to 10.

9. The phosphor panel of claim 1 wherein said inorganic phosphor absorbs radiation having a wavelength of from about 0.01 to about 10 nm and emits radiation having a wavelength of from about 300 to about 650 nm.

10. The phosphor panel of claim 1 that is a storage phosphor panel and wherein said inorganic phosphor is a storage phosphor containing iodine.

11. The phosphor panel of claim 10 wherein said storage phosphor is an iodide-containing alkaline earth fluorohalide.

12. The phosphor panel of claim 11 wherein said inorganic storage phosphor is represented by the following Structure (I):

$$MFX_{1-z}I_zuM^aX^a:yA:eQ:tD \quad \text{(I)}$$

wherein

M is Mg, Ca, Sr, Ba, or combinations thereof,
X is Cl, Br, or combinations thereof, $M^a$ is Na, K, Rb, Cs, or combinations thereof,
$X^a$ is F, Cl, Br, I, and combinations thereof,
A is Eu, Ce, Sm, Tb, or combinations thereof,
Q is BeO, MgO, CaO, SrO, BaO, ZnO, $Al_2O_3$, $La_2O_3$, $In_2O_3$, $SiO_2$, $TiO_2$, $ZrO_2$, $GeO_2$, $Nb_2O_5$, $Ta_2O_5$, $ThO_2$, or combinations thereof,
D is V, Cr, Mn, Fe, Co, Ni, or combinations thereof,
z is from 0.0001 to 1,
u is from 0 to 1,
y is from 0.0001 to 0.1,
e is from 0 to 1, and
t is from 0 to 0.01.

13. The phosphor panel of claim 12 wherein M is Ba, $M^a$ is Na, K, or a combination thereof, $X^a$ is F or Br, and A is Eu, Q is $SiO_2$ or $Al_2O_3$, and t is 0.

14. The phosphor panel of claim 1 further comprising a protective overcoat that comprises a miscible blend of a first polymer that is poly(vinylidene fluoride-co-tetrafluoroethylene) and a second polymer that is poly(methyl methacrylate) or poly(ethyl methacrylate) at a weight ratio of first polymer to said second polymer of from about 70:30 to about 10:90.

15. The phosphor panel of claim 1 that is free of peroxide and peroxide-generating compounds.

16. The phosphor panel of claim 1 further comprising a phenolic compound, an epoxy compound, phosphite, or organotin compound.

17. An image storage panel comprising, in order:
a support, an inorganic storage phosphor layer that comprises a barium fluorobromoiodide phosphor dispersed in a polymeric binder, and a protective overcoat disposed over said phosphor layer, the weight ratio of said phosphor to said polymeric binder being from about 10:1 to about 50:1,
said protective overcoat comprising:
a primary or secondary amine that is ethanolamine, t-butylamino ethanol, dodecylamine, hexamethylenediamine, diethanolamine, or 2-(t-butylamino)ethanol that is present in an amount of from about 0.05 to about 2% based on the weight of said barium fluorobromoiodide phosphor, and
a non-phosphite peroxide scavenger that is dithiaoctandiol, 4,4-thiobis(6-t-butyl-3-methylphenol, thiodiethylene bis(3,5-di-t-butyl-4-hydroxy)hydrocinnamate, thioglycol, O-acetyl-α-tocopherol, 2,6-di-t-butyl-4-methylphenol, 6-hydroxy-2,5,7,8-tetramethylchroman-2-carboxylic acid, distearyl thiodipropionate, dilauryl thiodipropionate, or 2,6-t-butyl-4-methylphenol that is present in an amount of from about 0.05 to about 2% based on the weight of said barium fluorobromoiodide phosphor.

18. The storage panel of claim 17 wherein said support is a polymeric film or reflective support.

19. The storage panel of claim 17 further comprising a phenolic compound, an epoxy compound, phosphite, or organotin compound.

20. A phosphor panel comprising a support having thereon a phosphor layer comprising an inorganic phosphor dispersed within a polymeric binder,
said phosphor panel further comprising a non-phosphite peroxide scavenger in an amount of from about 0.01 to about 5% based on the weight of said inorganic phosphor.

21. The phosphor panel of claim 20 wherein said non-phosphite peroxide scavenger is dithiaoctandiol, 4,4-thiobis (6-t-butyl-3-methylphenol, thiodiethylene bis(3,5-di-t-butyl-4-hydroxy)hydrocinnamate, thioglycol, O-acetyl-α-tocopherol, 2,6-di-t-butyl-4-methylphenol, 6-hydroxy-2,5,7,8-tetramethylchroman-2-carboxylic acid, distearyl thiodipropionate, dilauryl thiodipropionate, or 2,6-t-butyl-4-methylphenol that is present in an amount of from about 0.05 to about 2% based on the weight of said inorganic phosphor.

22. The phosphor panel of claim 20 that is a storage phosphor panel and wherein said inorganic phosphor is a storage phosphor containing iodine.

23. The phosphor panel of claim 20 wherein said non-phosphite peroxide scavenger is represented by the following Structure (III):

$$R^1\text{—}(S\text{—}R^3)_m\text{—}S\text{—}R^2 \tag{III}$$

wherein $R^1$ and $R^2$ are independently hydrogen, an alkyl, cycloalkyl, or aryl group, or together may form an aliphatic ring, $R^3$ is an alkylene group, and m is 0 to 10.

24. A method of making a phosphor panel comprising:
A) applying to a support, a phosphor layer formulation comprising an inorganic phosphor, a polymeric binder, and one or more non-peroxide-generating organic solvents as the sole coating solvents, to provide a phosphor layer, and
B) applying an overcoat formulation over said phosphor layer, said overcoat formulation comprising a binder and one or more non-peroxide-generating organic solvents as the sole coating solvents.

25. The method of claim 24 wherein said phosphor panel further comprises a primary or secondary amine having a pKa of 8.5 or more and a molecular weight less than 10,000 daltons, in an amount of from about 0.01 to about 5% based on the weight of said inorganic phosphor.

26. The method of claim 24 wherein the weight ratio of said polymeric binder to said inorganic phosphor is from about 10:1 to about 50:1, and said phosphor panel further comprises a non-phosphite peroxide scavenger.

27. The method of claim 24 wherein both said phosphor layer formulation and said overcoat formulation comprise the same or different non-peroxide-generating organic solvents that is methyl acetate, ethyl acetate, propyl acetate, n-butyl acetate, methanol, ethanol, n-propanol, n-butanol, methylene chloride, acetone, or a mixture of two or more of such solvents.

28. The method of claim 24 wherein said phosphor panel is an image storage panel and said inorganic phosphor is a storage phosphor comprising iodine.

29. The method of claim 24 wherein said phosphor panel further comprises a non-phosphite peroxide scavenger.

* * * * *